United States Patent
Lindman et al.

(10) Patent No.: US 9,622,182 B2
(45) Date of Patent: Apr. 11, 2017

(54) EMBEDDED COMPUTING DEVICE

(71) Applicant: Suunto Oy, Vantaa (FI)

(72) Inventors: Erik Lindman, Vantaa (FI); Jyrki Uusitalo, Vantaa (FI); Timo Eriksson, Vantaa (FI); Jari Akkila, Vantaa (FI); Michael Miettinen, Vantaa (FI)

(73) Assignee: Suunto Oy, Vantaa (FI)

( * ) Notice: Subject to any disclaimer, the term of this patent is extended or adjusted under 35 U.S.C. 154(b) by 0 days.

(21) Appl. No.: 15/095,178

(22) Filed: Apr. 11, 2016

(65) Prior Publication Data

US 2016/0309409 A1 Oct. 20, 2016

(51) Int. Cl.
*H04W 52/02* (2009.01)
*H04M 1/725* (2006.01)

(52) U.S. Cl.
CPC ..... *H04W 52/027* (2013.01); *H04M 1/72527* (2013.01); *H04W 52/0254* (2013.01); *H04W 52/0258* (2013.01)

(58) Field of Classification Search
CPC ............ G06F 1/3218; G09G 2330/02; H04W 52/027; H04W 52/0258
USPC ............ 455/552.1, 550.1, 566, 556.1, 556.2, 455/572.574
See application file for complete search history.

(56) References Cited

U.S. PATENT DOCUMENTS

| | | | |
|---|---|---|---|
| 5,963,219 A * | 10/1999 | Choi | G06F 1/30 345/501 |
| 2003/0009703 A1 | 1/2003 | Oshima et al. | |
| 2003/0135771 A1 | 7/2003 | Cupps et al. | |
| 2006/0232590 A1 * | 10/2006 | Bakalash | G06F 3/1423 345/502 |
| 2007/0234007 A1 | 10/2007 | Lin et al. | |
| 2008/0052493 A1 | 2/2008 | Chang | |
| 2010/0123727 A1 * | 5/2010 | Kwa | G09G 3/3611 345/522 |
| 2011/0307723 A1 | 12/2011 | Cupps et al. | |
| 2012/0054508 A1 | 3/2012 | Chen et al. | |
| 2012/0100895 A1 | 4/2012 | Priyantha et al. | |
| 2012/0280917 A1 | 11/2012 | Toksvig et al. | |
| 2014/0075178 A1 | 3/2014 | Trethewey | |
| 2014/0095829 A1 | 4/2014 | Mo et al. | |
| 2014/0156269 A1 | 6/2014 | Lee et al. | |

(Continued)

FOREIGN PATENT DOCUMENTS

| | | |
|---|---|---|
| EP | 2354891 A1 | 8/2011 |
| WO | WO2004064119 A2 | 7/2004 |
| WO | WO2014193672 A1 | 12/2014 |

OTHER PUBLICATIONS

Zangl: Windows XPe vs. Windows CE - whats the difference? REALGEEK FORUM, Feb. 23, 2007.

*Primary Examiner* — John J Lee
(74) *Attorney, Agent, or Firm* — Seppo Laine Oy

(57) ABSTRACT

According to an example aspect of the present invention, there is provided an apparatus comprising a first processing core configured to generate first control signals and to control a display by providing the first control signals to the display via a first display interface, a second processing core configured to generate second control signals and to control the display by providing the second control signals to the display via a second display interface, and the first processing core being further configured to cause the second processing core to enter and leave a hibernation state.

25 Claims, 6 Drawing Sheets

(56) References Cited

U.S. PATENT DOCUMENTS

2014/0267316 A1 9/2014 Connell et al.
2015/0205619 A1* 7/2015 Kato .................. G06F 9/4411
                                                         713/2

* cited by examiner

EMBEDDED COMPUTING DEVICE

FIELD OF INVENTION

The present invention in general relates, for example, to implementing multi-core or multi-chip embedded solutions.

BACKGROUND OF INVENTION

Embedded devices generally comprise objects that contain an embedded computing system, which may be enclosed by the object. The embedded computer system may be designed with a specific use in mind, or the embedded computer system may be at least in part general-purpose in the sense that a user may be enabled to install software in it. An embedded computer system may be based on a microcontroller or microprocessor CPU, for example.

Embedded devices may comprise one or more processors, user interfaces and displays, such that a user may interact with the device using the user interface. The user interface may comprise buttons, for example. An embedded device may comprise a connectivity function configured to communicate with a communications network, such as, for example, a wireless communications network. The embedded device may be enabled to receive from such a communications network information relating to, for example, a current time and current time zone.

More complex embedded devices, such as cellular telephones, may allow a user to install applications into a memory, such as, for example, a solid-state memory, comprised in the device. Embedded devices are frequently resource-constrained when compared to desktop or laptop computers. For example, memory capacity may be more limited than in desktop or laptop computers, processor computational capacity may be lower and energy may be available from a battery. The battery, which may be small, may be rechargeable.

Conserving battery power is a key task in designing embedded devices. A lower current usage enables longer time intervals in-between battery charging. For example, smartphones benefit greatly when they can survive an entire day before needing recharging, since users are thereby enabled to recharge their phones overnight, and enjoy uninterrupted use during the day.

Battery resources may be conserved by throttling a processor clock frequency between a maximum clock frequency and a lower clock frequency, for example one half of the maximum clock frequency. Another way to conserve battery power is to cause a display of an embedded device to switch itself off then the device is not used, since displaying content on a display consumes energy in order to cause the display to emit light that humans can see.

SUMMARY OF THE INVENTION

The invention is defined by the features of the independent claims. Some specific embodiments are defined in the dependent claims.

According to a first aspect of the present invention, there is provided an apparatus comprising a first processing core configured to generate first control signals and to control a display by providing the first control signals to the display via a first display interface, a second processing core configured to generate second control signals and to control the display by providing the second control signals to the display via a second display interface, and the first processing core being further configured to cause the second processing core to enter and leave a hibernation state.

Various embodiments of the first aspect may comprise at least one feature from the following bulleted list:
- the first processing core is electrically interfaced with at least one of: a user interface, a wireless communications port, a wired communications port, satellite positioning circuitry, a magnetometer, a gyroscope, an accelerometer and a pressure sensor
- the second processing core is electrically interfaced with at least one of: cellular communication circuitry, non-cellular wireless communication circuitry and a second wired communications port
- the first processing core and the second processing core are both electrically interfaced with a shared random access memory
- the first processing core is configured to cause the second processing core to leave the hibernation state responsive to a determination that at least one of a first graphics mode not supported by the first processing core is requested to be provided to the display and a need for the second processing core is predicted to occur
- the first processing core is configured to cause the second processing core to leave the hibernation state responsive to a determination that a communications capability of the second processing core is requested
- the first processing core is configured to cause the second processing core to enter the hibernation state responsive to a determination that a second graphics mode, which is supported by the first processing core, is requested to be provided to the display
- the second graphics mode comprises a reduced map view graphics mode
- the first processing core is configured to cause the second processing core to enter the hibernation state responsive to a determination that a user interface type not supported by the first processing core is no longer requested
- the apparatus comprises the display, the display having a first electrical connection to the first display interface in the first processing core and a second electrical connection to the second display interface in the second processing core
- the first processing core and the second processing core are comprised in a same integrated circuit
- the first processing core is comprised in a microcontroller and the second processing core is comprised in a microprocessor, the microcontroller being external to the microprocessor and the microprocessor being external to the microcontroller
- the apparatus is configured to store, at least in part, a context of the second processing core in connection with transitioning the second processing core into the hibernation state.

According to a second aspect of the present invention, there is provided a method, comprising generating, by a first processing core, first control signals, controlling a display by providing the first control signals to the display via a first display interface, generating, by a second processing core, second control signals, controlling the display by providing the second control signals to the display via a second display interface, and causing the second processing core to enter and leave a hibernation state.

Various embodiments of the first aspect may comprise at least one feature from the following bulleted list:

the first processing is core electrically interfaced with at least one of: a user interface, a wireless communications port, a wired communications port, satellite positioning circuitry, a magnetometer, a gyroscope, an accelerometer and a pressure sensor the second processing core is electrically interfaced with at least one of: cellular communication circuitry, non-cellular wireless communication circuitry and a second wired communications port the first processing core and the second processing core are both electrically interfaced with a shared random access memory the method further comprises causing, by the first processing core, the second processing core to leave the hibernation state responsive to a determination that a first graphics mode not supported by the first processing core is requested to be provided to the display the method further comprised causing, by the first processing core, the second processing core to leave the hibernation state responsive to a determination that a communications capability of the second processing core is requested the method further comprises causing, by the first processing core, the second processing core to enter the hibernation state responsive to a determination that a second graphics mode, which is supported by the first processing core, is requested to be provided to the display the second graphics mode comprises a reduced map view graphics mode the method further comprises causing, by the first processing core, the second processing core to enter the hibernation state responsive to a determination that a user interface type not supported by the first processing core is no longer requested the method is performed in an apparatus comprising the display, the display having a first electrical connection to the first display interface in the first processing core and a second electrical connection to the second display interface in the second processing core the first processing core and the second processing core are comprised in a same integrated circuit the first processing core is comprised in a microcontroller and the second processing core is comprised in a microprocessor, the microcontroller being external to the microprocessor and the microprocessor being external to the microcontroller.

According to a third aspect of the present invention, there is provided an apparatus comprising at least one processing core and at least one memory including computer program code, the at least one memory and the computer program code being configured to, with the at least one processing core, cause the apparatus at least to generate, by a first processing core, first control signals, control a display by providing the first control signals to the display via a first display interface, generate, by a second processing core, second control signals, control the display by providing the second control signals to the display via a second display interface, and cause the second processing core to enter and leave a hibernation state.

According to a fourth aspect of the present invention, there is provided an apparatus comprising means for generating, by a first processing core, first control signals, means for controlling a display by providing the first control signals to the display via a first display interface, means for generating, by a second processing core, second control signals, means for controlling the display by providing the second control signals to the display via a second display interface, and means for causing the second processing core to enter and leave a hibernation state.

According to a fifth aspect of the present invention, there is provided a non-transitory computer readable non-transitory medium having stored thereon a set of computer readable instructions that, when executed by at least one processor, cause an apparatus to at least generate, by a first processing core, first control signals, control a display by providing the first control signals to the display via a first display interface, generate, by a second processing core, second control signals, control the display by providing the second control signals to the display via a second display interface, and cause the second processing core to enter and leave a hibernation state.

According to a sixth aspect of the present invention, there is provided a computer program configured to cause a method in accordance with the second aspect to be performed, when run.

INDUSTRIAL APPLICABILITY

At least some embodiments of the present invention find industrial application in embedded multi-chip or multi-core and power usage optimization thereof.

DETAILED DESCRIPTION OF EXAMPLE EMBODIMENTS

Furnishing an embedded device with two or more processor cores, at least some of which are enabled to control the display of the device, makes possible power savings where a less-capable processor core is configured to toggle a more capable processor core to and from a hibernation state. A hibernation state may comprise that a clock frequency of the more capable processing core is set to zero, for example. In a hibernation state, in addition to, or alternatively to, setting the clock frequency of the more capable processing core to zero, a memory refresh rate of memory used by the more capable core may be set to zero. Alternatively to zero, a low non-zero frequency may be used for the clock frequency and/or the memory refresh frequency. In some embodiments, a more capable processing core may employ a higher-density memory technology, such as double data rate, DDR, memory, and a less capable processing core may employ a lower-density memory technology, such as static random access memory, SRAM, memory. In a hibernation state the hibernated processing core, or more generally processing unit, may be powered off. Alternatively to a processor core, an entire processor may, in some embodiments, be transitioned to a hibernation state. An advantage of hibernating an entire processor is that circuitry in the processor outside the core is also hibernated, further reducing current consumption.

Figure 1:
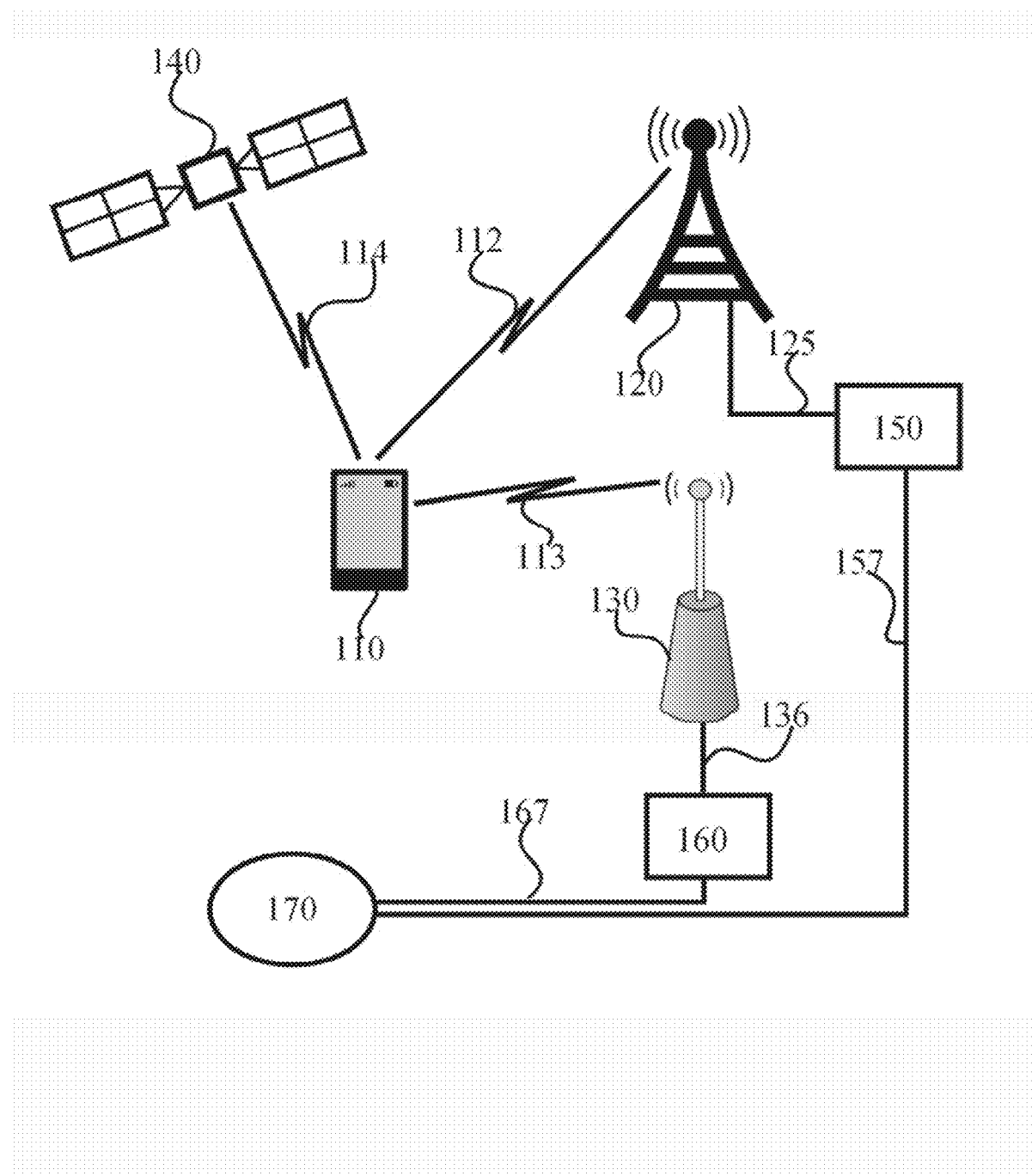
FIG. 1 illustrates an example system capable of supporting at least some embodiments of the present invention.

FIG. 1 illustrates an example system capable of supporting at least some embodiments of the present invention. In the example system of FIG. 1 is comprised device 110, which may comprise an embedded device, such as for example a smart watch, personal health monitor, cellular phone, smartphone or other suitable device.

Device 110 is in the example of FIG. 1 configured with a plurality of communication interfaces. A first communication interface enables device 110 to receive satellite positioning information from satellite constellation 140, via satellite link 114. Examples of suitable satellite positioning constellations include global positioning system, GPS, GLONASS, Beidou and the Galileo satellite positioning constellation.

A second communications interface enables device 110 to communicate with a cellular communications system, such as for example a wideband code division multiple access, WCDMA, or long term evolution, LTE, network. A cellular link 112 may be configured to convey information between device 110 and base station 120. The cellular link 112 may be configured in accordance with the same cellular communications standard that both device 110 and base station 120 both support. Base station 120 may be comprised in a cellular radio access network that comprises a plurality of base stations. Base station 120 may be arranged to communicate with core network node 150 via connection 125. Core network node 150 may comprise a switch, mobility management entity or gateway, for example. Core network node 150 may be arranged to communicate with a further network 170, such as for example the Internet, via connection 157.

A third communications interface enables device 110 to communicate with a non-cellular communications system, such as for example a wireless local area network, WLAN, Bluetooth or worldwide interoperability for microwave access, WiMAX, system. A further example is an inductive underwater communication interface. A non-cellular link 113 may be configured to convey information between device 110 and access point 130. The non-cellular link 113 may be configured in accordance with the same non-cellular technology that both device 110 and access point 130 both support. Access point 130 may be arranged to communicate with gateway 160 via connection 136. Gateway 160 may be arranged to communicate with further network 170 via connection 167. Each of connections 125, 157, 136 and 167 may be wire-line or at least in part wireless. Not all of these connections need to be of the same type. In certain embodiments, at least one of the first communications interface, the second communications interface and the third communications interface is absent.

A fourth communications link may enable device 110 to communicate with a mobile device. For example, a low-power wireless interface may enable communication with a mobile device where device 110 lacks cellular capability and a mobile device distinct from device 110 has cellular capability. An example of a low-power wireless interface is Bluetooth-low energy, BLE, or Bluetooth Smart.

In use, device 110 may use satellite positioning information from satellite constellation 140 to determine a geo-location of device 110. The geo-location may be determined in terms of coordinates, for example. Device 110 may be configured to present, on a display that may be comprised in device 110, a map with the determined geo-location of device 110 presented thereon. For example, device 110 may display a street or feature map of the surroundings, with a symbol denoting the current location of device 110 on the map. Providing a map with a current location of device 110 indicated thereon, and/or providing navigation instructions, may be referred to as a mapping service.

In some embodiments, device 110 may provide connectivity services to a user, such as for example web browsing, instant messaging and/or email. Device 110 may be configured to provide connectivity service to its functions and/or applications, in some embodiments including enabling remote access to these functions and/or services over a network, such as the Internet. Thus device 110 may be trackable over the Internet, for example. Such connectivity services may be run over bidirectional communication links, such as for example cellular link 112 and/or non-cellular link 113. In general, device 110 may provide a service, such as for example a mapping service or a connectivity service, to a user via a display.

Device 110 may comprise two or more processing units. The two or more processing units may each comprise a processing core. Each processing unit may comprise one or multiple uniformal or heterogeneous processor cores and/or different volatile and non-volatile memories. For example, device 110 may comprise a microprocessor with at least one processing core, and a microcontroller with at least one processing core. The processing cores needn't be of the same type, for example, a processing core in a microcontroller may have more limited processing capability and/or a less capable memory technology than a processing core comprised in a microprocessor. In some embodiments, a single integrated circuit comprises two processing cores, a first one of which has lesser processing capability and consumes less power, and a second one of which has greater processing capability and consumes more power. In general a first one of the two processing units may have lesser processing capability and consume less power, and a second one of the two processing units may have greater processing capability and consume more power. Each of the processing units may be enabled to control the display of device 110. The more capable processing unit may be configured to provide a richer visual experience via the display. The less capable processing unit may be configured to provide a reduced visual experience via the display. An example of a reduced visual experience is a reduced colour display mode, as opposed to a rich colour display mode. An another example of a reduced visual experience is one which is black-and-white. An example of a richer visual experience is one which uses colours. Colours may be represented with 16 bits or 24 bits, for example.

Each of the two processing units may comprise a display interface configured to communicate toward the display. For example, where the processing units comprise a microprocessor and a microcontroller, the microprocessor may comprise transceiver circuitry coupled to at least one metallic pin under the microprocessor, the at least one metallic pin being electrically coupled to an input interface of a display control device. The display control device, which may be comprised in the display, is configured to cause the display to display information in dependence of electrical signals received in the display control device. Likewise the microcontroller in this example may comprise transceiver circuitry coupled to at least one metallic pin under the microcontroller, the at least one metallic pin being electrically coupled to an input interface of a display control device. The display control device may comprise two input interfaces, one coupled to each of the two processing units, or alternatively the display control device may comprise a single input interface into which both processing units are enabled to provide inputs via their respective display interfaces. Thus a display interface in a processing unit may comprise transceiver circuitry enabling the processing unit to transmit electrical signals toward the display.

One of the processing units, for example the less capable or the more capable one, may be configured to control, at least in part, the other processing unit. For example, the less capable processing unit, for example a less capable processing core, may be enabled to cause the more capable processing unit, for example a more capable processing core, to transition into and from a hibernating state. These transitions may be caused to occur by signaling via an inter-processing unit interface, such as for example an inter-core interface.

When transitioning into a hibernating state from an active state, the transitioning processing unit may store its context, at least in part, into a memory, such as for example a pseudostatic random access memory, PSRAM, SRAM, FLASH or ferroelectric RAM, FRAM. The context may comprise, for example, content of registers and/or addressing. When transitioning from a hibernated state using a context stored in memory, a processing unit may resume processing faster and/or from a position where the processing unit was when it was hibernated. This way, a delay experienced by a user may be minimised. Alternative terms occasionally used for context include state and image. In a hibernating state, a clock frequency of the processing unit and/or an associated memory may be set to zero, meaning the processing unit is powered off and does not consume energy. Circuitry configured to provide an operating voltage to at least one processing unit may comprise a power management integrated circuit, PMIC, for example. Since device 110 comprises another processing unit, the hibernated processing unit may be powered completely off while maintaining usability of device 110.

When transitioning from a hibernated state to an active state, the transitioning processing unit may have its clock frequency set to a non-zero value. The transitioning processing unit may read a context from a memory, wherein the context may comprise a previously stored context, for example a context stored in connection with transitioning into the hibernated state, or the context may comprise a default state or context of the processing unit stored into the memory in the factory. The memory may comprise pseudostatic random access memory, SRAM, FLASH and/or FRAM, for example. The memory used by the processing unit transitioning to and from the hibernated state may comprise DDR memory, for example.

With one processing unit in a hibernation state, the non-hibernated processing unit may control device 110. For example, the non-hibernated processing unit may control the display via the display interface comprised in the non-hibernated processing unit. For example, where a less capable processing unit has caused a more capable processing unit to transition to the hibernated state, the less capable processing unit may provide a reduced user experience, for example, via at least in part, the display. An example of a reduced user experience is a mapping experience with a reduced visual experience comprising a black-and-white rendering of the mapping service. The reduced experience may be sufficient for the user to obtain a benefit from it, with the advantage that battery power is conserved by hibernating the more capable processing unit. In some embodiments, a more capable processing unit, such as a microprocessor, may consume a milliampere of current when in a non-hibernated low-power state, while a less capable processing unit, such as a microcontroller, may consume only a microampere when in a non-hibernated low-power state. In non-hibernated states current consumption of processing units may be modified by setting an operating clock frequency to a value between a maximum clock frequency and a minimum non-zero clock frequency. In at least some embodiments, processing units, for example less capable processing units, may be configurable to power down for short periods, such as 10 or 15 microseconds, before being awakened. In the context of this document, this is not referred to as a hibernated state but an active low-power configuration. An average clock frequency calculated over a few such periods and the intervening active periods is a positive non-zero value. A more capable processing unit may be enabled to run the Android operating system, for example.

Triggering events for causing a processing unit to transition to the hibernated state include a user indicating a non-reduced experience is no longer needed, a communication interface of the processing unit no longer being needed and device 110 not having been used for a predetermined length of time. An example indication that a non-reduced experience is no longer needed is where the user deactivates a full version of an application, such as for example a mapping application. Triggering events for causing a processing unit to transition from the hibernated state to an active state may include a user indicating a non-reduced experience is needed, a communication interface of the processing unit being requested and device 110 being interacted with after a period of inactivity. Alternatively or additionally, external events may be configured as triggering events, such as, for example, events based on sensors comprised in device 110. An example of such an external event is a clock-based event which is configured to occur at a preconfigured time of day, such as an alarm clock function, for example. In at least some embodiments, the non-reduced experience comprises use of a graphics mode the non-hibernated processing unit cannot support, but the hibernated processing unit can support. A graphics mode may comprise a combination of a resolution, colour depth and/or refresh rate, for example.

In some embodiments, a user need or user request for the non-reduced experience may be predicted. Such predicting may be based at least in part on a usage pattern of the user, where the user has tended to perform a certain action in the reduced experience before requesting the non-reduced experience. In this case, responsive to a determination the user performs the certain action in the reduced experience, the non-reduced mode may be triggered.

If the processing units reside in separate devices or housings, such as a wrist-top computer and a handheld or fixedly mounted display device for example, a bus may be implemented in a wireless fashion by using a wireless communication protocol. Radio transceiver units functionally connected to their respective processing units may thus perform the function of the bus, forming a personal area network, PAN. The wireless communication protocol may be one used for communication between computers, and/or between any remote sensors, such as a Bluetooth LE or the proprietary ANT+ protocol. These are using direct-sequence spread spectrum, DSSS, modulation techniques and an adaptive isochronous network configuration, respectively. Enabling descriptions of necessary hardware for various implementations for wireless links are available, for example, from the Texas Instrument®'s handbook "Wireless Connectivity" which includes IC circuits and related hardware configurations for protocols working in sub-1- and 2.4-GHz frequency bands, such as ANT™, Bluetooth®, Bluetooth® low energy, RFID/NFC, PurePath™ Wireless audio, ZigBee®, IEEE 802.15.4, ZigBee RF4CE, 6LoW-PAN, Wi-Fi®.

In connection with hibernation, the PAN may be kept in operation by the non-hibernated processing unit, such that when hibernation ends, the processing unit leaving the hibernated mode may have access to the PAN without needing to re-establish it.

Figure 2:
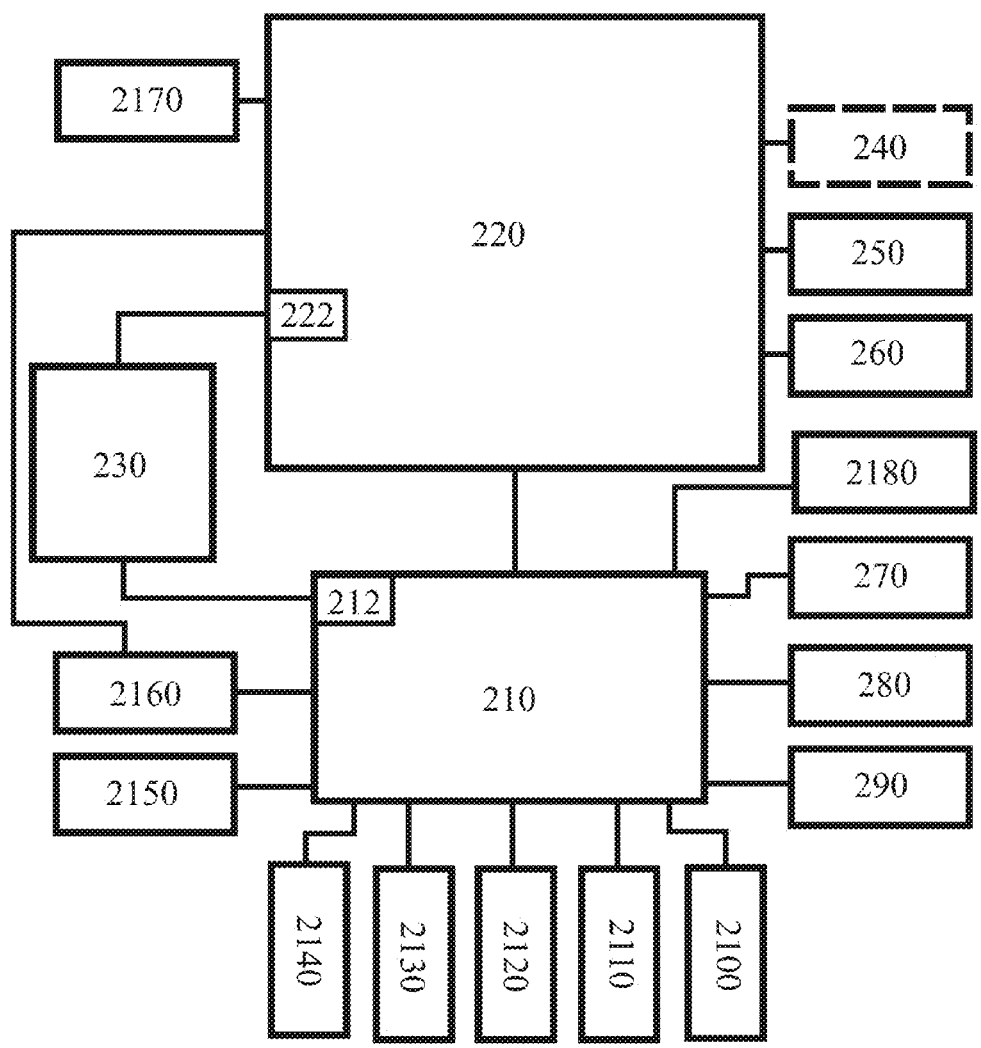
FIG. 2 illustrates a first example apparatus capable of supporting at least some embodiments of the present invention.

FIG. 2 illustrates a first example apparatus capable of supporting at least some embodiments of the present invention. The illustrated apparatus comprises a microcontroller 210 and a microprocessor 220. Microcontroller 210 may comprise, for example, a Silabs EMF32 or a Renesas RL78 microcontroller, or similar. Microprocessor 220 may comprise, for example, a Qualcomm Snapdragon processor or an ARM Cortex-based processor. Microcontroller 210 and microprocessor 220 are in the example of FIG. 2 communicatively coupled with an inter-core interface, which may comprise, for example, a serial or a parallel communication interface. More generally an interface disposed between microcontroller 210 and microprocessor 220 may be considered an inter-processing unit interface.

Microcontroller 210 is communicatively coupled, in the illustrated example, with a buzzer 270, a universal serial bus, USB, interface 280, a pressure sensor 290, an acceleration sensor 2100, a gyroscope 2110, a magnetometer 2120, satellite positioning circuitry 2130, a Bluetooth interface 2140, user interface buttons 2150 and a touch interface 2160. Pressure sensor 290 may comprise an atmospheric pressure sensor, for example.

Microprocessor 220 is communicatively coupled with an optional cellular interface 240, a non-cellular interface 250 and a USB interface 260. Microprocessor 220 is further communicatively coupled, via microprocessor display interface 222, with display 230. Microcontroller 210 is likewise communicatively coupled, via microcontroller display interface 212, with display 230. Microprocessor display interface 222 may comprise communication circuitry comprised in microprocessor 220. Microcontroller display interface 212 may comprise communication circuitry comprised in microcontroller 210.

Microcontroller 210 may be configured to determine whether triggering events occur, wherein responsive to the triggering events microcontroller 210 may be configured to cause microprocessor 220 to transition into and out of the hibernating state described above. When microprocessor 220 is in the hibernating state, microcontroller 210 may control display 230 via microcontroller display interface 222. Microcontroller 210 may thus provide, when microprocessor 220 is hibernated, for example, a reduced experience to a user via display 230.

Responsive to a triggering event, microcontroller 210 may cause microprocessor 220 to transition from the hibernated state to an active state. For example, where a user indicates, for example via buttons 2150, that he wishes to originate a cellular communication connection, microcontroller 210 may cause microprocessor 220 to transition to an active state since cellular interface 240 is controllable by microprocessor 220, but, in the example of FIG. 2, not directly usable by microcontroller 210. In some embodiments, when microprocessor 220 is hibernated, also cellular interface 240 is in a hibernated state. Cellular interface 240 may comprise an electrical interface to a cellular transceiver, for example. Cellular interface 240 may comprise control circuitry of a cellular transceiver.

In various embodiments, at least two elements illustrated in FIG. 2 may be integrated on a same integrated circuit. For example, microprocessor 220 and microcontroller 210 may be disposed as processing cores in a same integrated circuit. Where this is the case, for example, cellular interface 240 may be a cellular interface of this integrated circuit, comprised in this integrated circuit, with cellular interface 240 being controllable by microprocessor 220 but not by microcontroller 210. In other words, individual hardware features of the integrated circuit may be controllable by one of microcontroller 210 and microprocessor 220, but not both. On the other hand, some hardware features may be controllable by either processing unit. For example, USB interface 260 and USB interface 280 may be in such an integrated embodiment one and the same USB interface of the integrated circuit, controllable by either processing core.

In FIG. 2 are further illustrated memory 2170 and memory 2180. Memory 2170 is used by microprocessor 220, and may be based on a DDR memory technology, such as for example DDR2 or DDR3, for example. Memory 2180 is used by microcontroller 210, and may be based on SRAM technology, for example.

Figure 3:
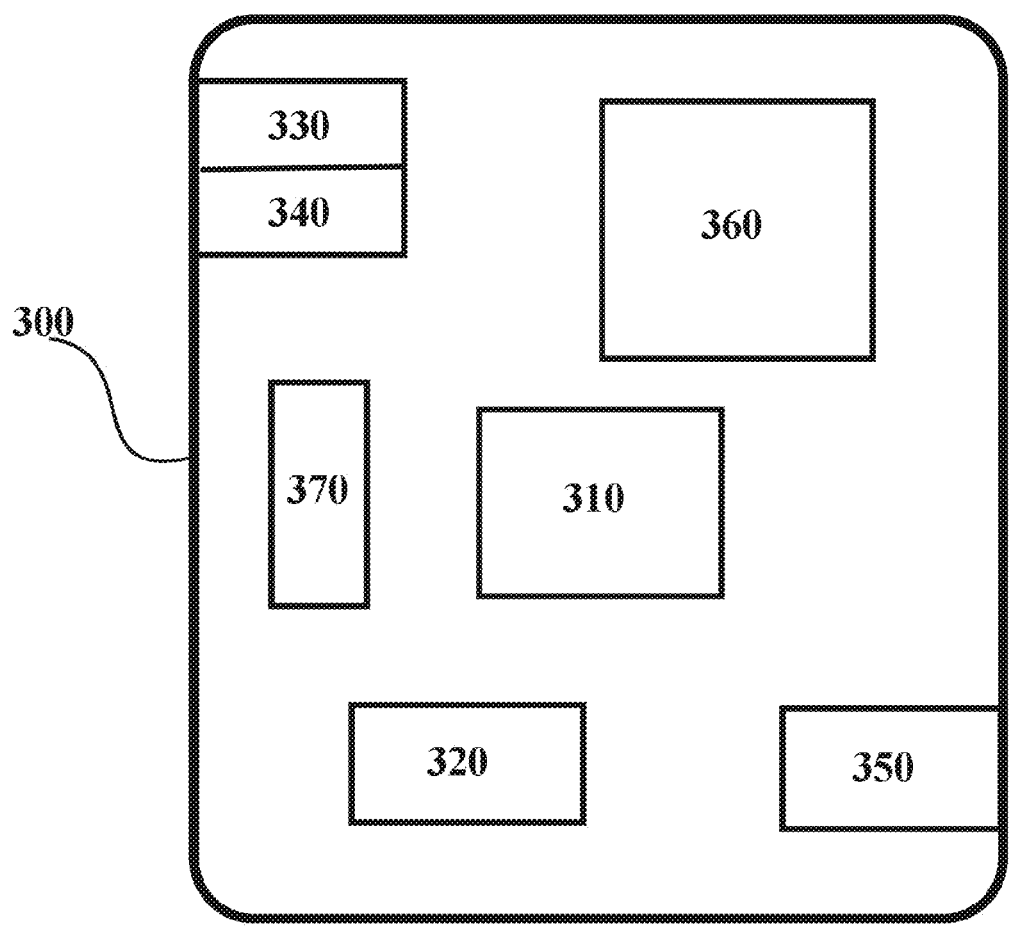
FIG. 3 illustrates a second example apparatus capable of supporting at least some embodiments of the present invention.

FIG. 3 illustrates a second example apparatus capable of supporting at least some embodiments of the present invention.

Illustrated is device 300, which may comprise, for example, an embedded device 110 of FIG. 1. Comprised in device 300 is processor 310, which may comprise, for example, a single- or multi-core processor wherein a single-core processor comprises one processing core and a multi-core processor comprises more than one processing core. Processor 310 may correspond to the structure illustrated in FIG. 2, with the exception of display 230, for example. Processor 310 may comprise more than one processor or processing unit. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise volatile and/or non-volatile memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example. Transmitter 330 and/or receiver 340 may be controllable via cellular interface 240, non-cellular interface 250 and/or USB interface 280 of FIG. 2, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. User input to UI 360 may be based on patterns, such as, for example, where a user shakes device 300 to initiate actions via UI 360. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games. UI 360 may comprise, for example, buttons 2150 and display 230 of FIG. 2.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
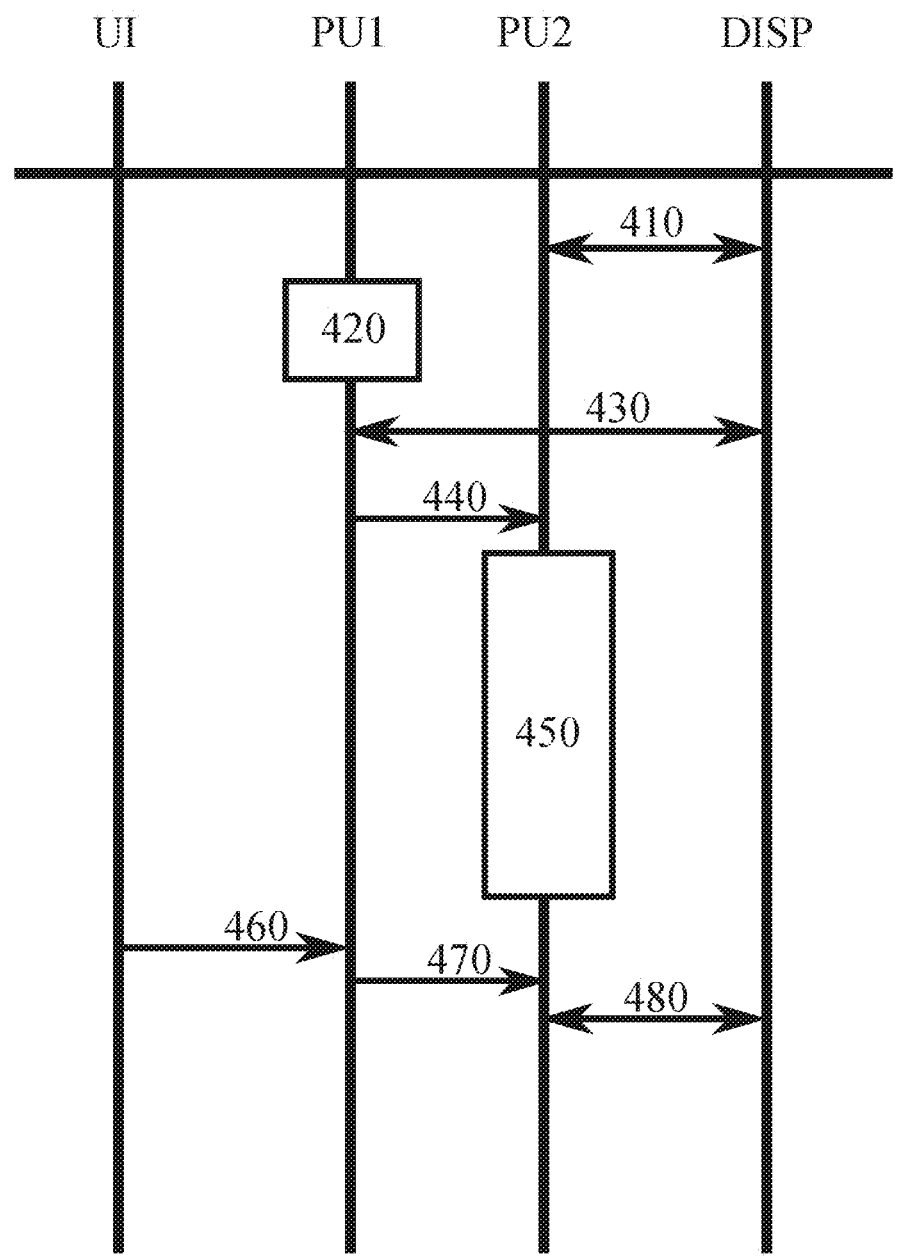
FIG. 4 illustrates signaling in accordance with at least some embodiments of the present invention.

FIG. 4 illustrates signaling in accordance with at least some embodiments of the present invention. On the vertical axes are disposed, from left to right, user interface UI, processing unit PU1, processing unit 2 PU2, and finally display DISP. Time advances from the top toward the bottom. Processing unit 2 may have higher processing capability, and be associated with a higher current consumption, than processing unit 1.

In phase 410, processing unit 2, which may comprise a processing core, controls the display. For example, processing unit 2 may run an application and provide to the display instructions to display information reflective of the state of the application.

In phase 420, processing unit 1 determines that a triggering event occurs, the triggering event being associated with a transition of processing unit 2 from an active state to a hibernated state. Processing unit 1 may determine an occurrence of a triggering event by receiving from processing unit 2 an indication that a task performed by processing unit 2 has been completed, for example. As discussed above, the hibernating state may comprise that a clock frequency of processing unit 2 is set to zero. Responsive to the determination of phase 420, processing unit 1 assumes control of the display in phase 430, and causes processing unit 2 to transition to the hibernating state in phase 440. Subsequently, in phase 450, processing unit 2 is in the hibernated state. When processing unit 2 is in the hibernated state, battery resources of the device may be depleted at a reduced rate. In some embodiments, phase 430 may start at the same time as phase 440 occurs, or phase 440 may take place before phase 430 starts.

In phase 460, a user interacts with the user interface UI in such a way that processing unit 1 determines a triggering event to transition processing unit 2 from the hibernated state to an active state. For example, the user may trigger a web browser application that requires a connectivity capability that only processing unit 2 can provide. Responsively, in phase 470 processing unit 1 causes processing unit 2 to wake up from the hibernating state. As a response, processing unit 2 may read a state from a memory and wake up to this state, and assume control of the display, which is illustrated as phase 480.

Figure 5:
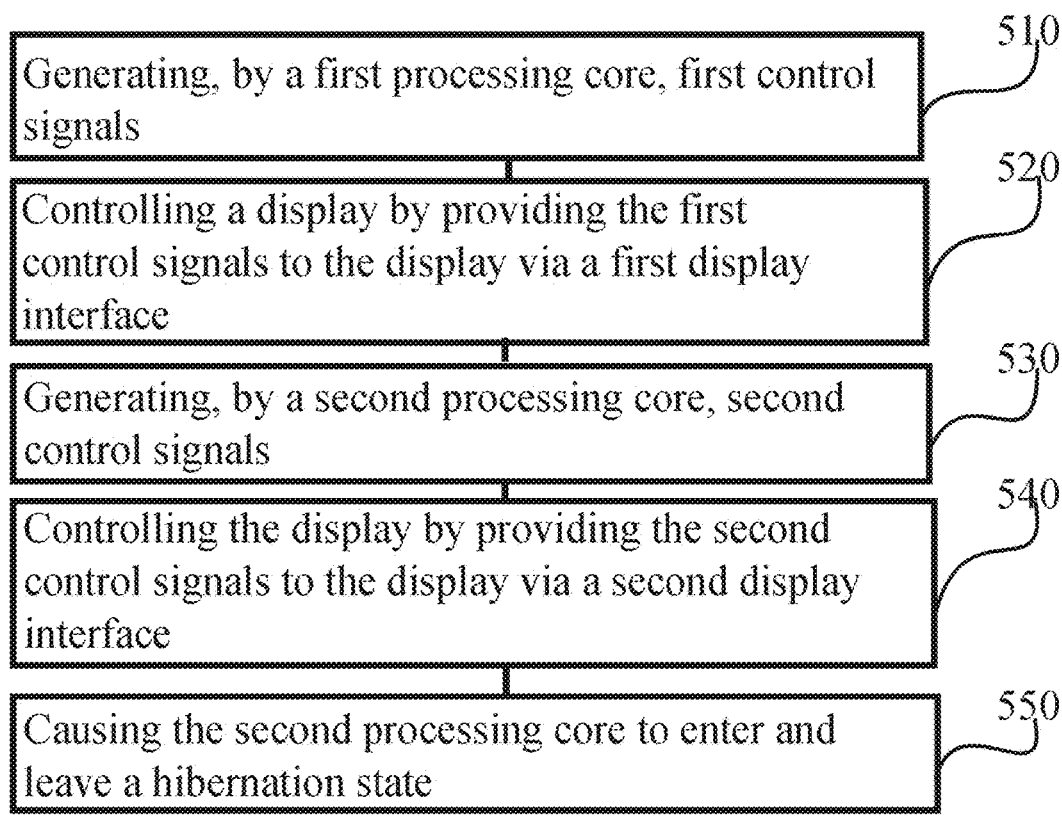
FIG. 5 is a first flow chart of a first method in accordance with at least some embodiments of the present invention.

FIG. 5 is a first flow chart of a first method in accordance with at least some embodiments of the present invention. The phases of the illustrated method may be performed in device 110 of FIG. 1, or in the apparatus of FIG. 2, for example.

Phase 510 comprises generating, by a first processing core, first control signals. Phase 520 comprises controlling a display by providing the first control signals to the display via a first display interface. Phase 530 comprises generating, by a second processing core, second control signals. Phase 540 comprises controlling the display by providing the second control signals to the display via a second display interface. Finally, phase 550 comprises causing the second processing core to enter and leave a hibernation state.

Figure 6:
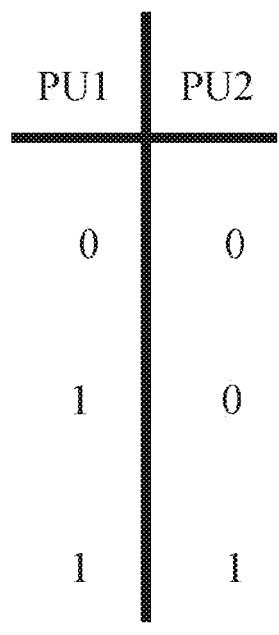
FIG. 6 is a state transition diagram in accordance with at least some embodiments of the present invention.
Figure 6:
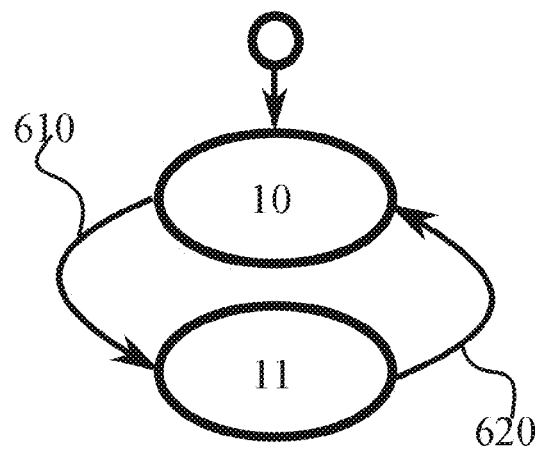

FIG. 6 is a state transition diagram in accordance with at least some embodiments of the present invention.

PU1 corresponds to processing unit 1, for example, a less capable processing unit. PU2 corresponds to processing unit 2, for example, a more capable processing unit. These units may be similar to those in discussed in connection with FIG. 4, for example. In an initial state, the device comprising PU1 and PU2 is in an inactive state, with zeros indicating the states of both PU1 and PU2. PU1 and PU2 are both switched off.

Starting from the initial power-off state, first PU1 is powered up, indicated as a "1" in the state of PU1, while PU2 remains in an off state, denoted by zero. Thus the compound state is "10", corresponding to a case where PU1 is active and PU2 is not. In this state, the device may offer a reduced experience to a user and consume relatively little current from battery reserves.

In addition to, or alternatively to, a power-off state PU1 and/or PU2 may have an intermediate low-power state from which it may be transitioned to an active state faster than from a complete power-off state. For example, a processing unit may be set to such an intermediate low-power state before being set to a power-off state. In case the processing unit is needed soon afterward, it may be caused to transition back to the power-up state. If no need for the processing unit is identified within a preconfigured time, the processing unit may be caused to transition from the intermediate low-power state to a power-off state.

Arrow 610 denotes a transition from state "10" to state "11", in other words, a transition where PU2 is transitioned from the hibernated state to an active state, for example, a state where its clock frequency is non-zero. PU1 may cause the transition denoted by arrow 610 to occur, for example, responsive to a triggering event. In state "11", the device may be able to offer a richer experience, at the cost of faster battery power consumption.

Arrow 620 denotes a transition from state "11" to state "10", in other words, a transition where PU2 is transitioned from an active state to the hibernated state. PU1 may cause the transition denoted by arrow 620 to occur, for example, responsive to a triggering event.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, described features, structures, or characteristics may be combined in any suitable or technically feasible manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
a first processing core configured to generate first control signals and to control a display by providing the first control signals to the display via a first display interface;
a second processing core configured to generate second control signals and to control the display by providing the second control signals to the display via a second display interface, and
the first processing core being further configured to cause the second processing core to enter and leave a hibernation state, wherein the first processing core is configured to cause the second processing core to leave the hibernation state responsive to a determination that a first graphics mode not supprted by the first processing core is requested to be provided to the display.

2. The apparatus according to claim 1, wherein the first processing core is electrically interfaced with at least one of: a user interface, a wireless communications port, a wired communications port, satellite positioning circuitry, a magnetometer, a gyroscope, an accelerometer and a pressure sensor.

3. The apparatus according to claim 1, wherein the second processing core is electrically interfaced with at least one of: cellular communication circuitry, non-cellular wireless communication circuitry and a second wired communications port.

4. The apparatus according to claim 1, wherein the first processing core and the second processing core are both electrically interfaced with a shared random access memory.

5. The apparatus according to claim 1, wherein the first processing core is further configured to predict, based on a usage pattern of a user, a need for the first graphics mode.

6. The apparatus according to claim 1, wherein the first processing core is configured to cause the second processing core to leave the hibernation state responsive to a determination that at least one of a communications capability of the second processing core is requested and a need for the second processing core is predicted to occur.

7. The apparatus according to claim 1, wherein the first processing core is configured to cause the second processing core to enter the hibernation state responsive to a determination that a second graphics mode, which is supported by the first processing core, is requested to be provided to the display.

8. The apparatus according to claim 7, wherein the second graphics mode comprises a reduced map view graphics mode.

9. The apparatus according to claim 1, wherein the first processing core is configured to cause the second processing core to enter the hibernation state responsive to a determination that a user interface type not supported by the first processing core is no longer requested.

10. The apparatus according claim 1, wherein the apparatus comprises the display, the display having a first electrical connection to the first display interface in the first processing core and a second electrical connection to the second display interface in the second processing core.

11. The apparatus according to claim 1, wherein the first processing core and the second processing core are comprised in a same integrated circuit.

12. The apparatus according to claim 1, wherein the first processing core is comprised in a microcontroller and the second processing core is comprised in a microprocessor, the microcontroller being external to the microprocessor and the microprocessor being external to the microcontroller.

13. The apparatus according to claim 1, wherein the apparatus is configured to store, at least in part, a context of the second processing core in connection with transitioning the second processing core into the hibernation state.

14. A method, comprising:
generating, by a first processing core, first control signals;
controlling a display by providing the first control signals to the display via a first display interface;
generating, by a second processing core, second control signals;
controlling the display by providing the second control signals to the display via a second display interface,
causing the second processing core to enter and leave a hibernation state, and
causing, by the first processing core, the second processing core to leave the hibernation state responsive to a determination that a first graphics mode not supported by the first processing core is requested to be provided to the display.

15. The method according to claim 14, wherein the first processing is core electrically interfaced with at least one of: a user interface, a wireless communications port, a wired communications port, satellite positioning circuitry, a magnetometer, a gyroscope, an accelerometer and a pressure sensor.

16. The method according to claim 14, wherein the second processing core is electrically interfaced with at least one of: cellular communication circuitry, non-cellular wireless communication circuitry and a second wired communications port.

17. The method according to claim 14, wherein the first processing core and the second processing core are both electrically interfaced with a shared random access memory.

18. The method according to claim 14, further comprising predicting, by the first processing core, based on a usage pattern of user, a need for the first graphics mode.

19. The method according to claim 14, further comprising causing, by the first processing core, the second processing core to leave the hibernation state responsive to a determination that at least one of a communications capability of the second processing core is requested and a need for the second processing core is predicted to occur.

20. The method according to claim 14, further comprising causing, by the first processing core, the second processing core to enter the hibernation state responsive to a determination that a second graphics mode, which is supported by the first processing core, is requested to be provided to the display.

21. The method according to claim 20, wherein the second graphics mode comprises a reduced map view graphics mode.

22. The method according to claim 14, further comprising causing, by the first processing core, the second processing core to enter the hibernation state responsive to a determination that a user interface type not supported by the first processing core is no longer requested.

23. The method according to claim 14, wherein the method is performed in an apparatus comprising the display, the display having a first electrical connection to the first display interface in the first processing core and a second electrical connection to the second display interface in the second processing core.

24. The method according to claim 14, wherein the first processing core and the second processing core are comprised in a same integrated circuit.

25. A non-transitory computer readable non-transitory medium having stored thereon a set of computer readable instructions that, when executed by at least one processor, cause an apparatus to at least:
generate, by a first processing core, first control signals;
control a display by providing the first control signals to the display via a first display interface;
generate, by a second processing core, second control signals;
control the display by providing the second control signals to the display via a second display interface,
cause the second processing core to enter and leave a hibernation state, and
causing, by the first processing core, the second processing core to leave the hibernation state responsive to a determination that a first graphics mode not supported by the first processing core is requested to be provided to the display.

* * * * *